(12) United States Patent
Costa

(10) Patent No.: US 12,305,313 B2
(45) Date of Patent: May 20, 2025

(54) BASE FABRIC, BONDED FABRIC, HIGH PERFORMANCE BELT AND MANUFACTURING PROCESSES THEREOF

(71) Applicant: COSTA S.R.L., Podenzano (IT)

(72) Inventor: Giuliano Costa, Podenzano (IT)

(73) Assignee: COSTA S.R.L., Podenzano (IT)

( * ) Notice: Subject to any disclaimer, the term of this patent is extended or adjusted under 35 U.S.C. 154(b) by 215 days.

(21) Appl. No.: 17/911,674

(22) PCT Filed: Mar. 16, 2021

(86) PCT No.: PCT/IB2021/052169
§ 371 (c)(1),
(2) Date: Sep. 15, 2022

(87) PCT Pub. No.: WO2021/186339
PCT Pub. Date: Sep. 23, 2021

(65) Prior Publication Data
US 2023/0136103 A1    May 4, 2023

(30) Foreign Application Priority Data
Mar. 18, 2020   (IT) .............................. 1020200005740

(51) Int. Cl.
| | |
|---|---|
| B29C 65/00 | (2006.01) |
| D03D 1/00 | (2006.01) |
| D03D 13/00 | (2006.01) |
| F16G 1/10 | (2006.01) |
| B29C 65/48 | (2006.01) |

(52) U.S. Cl.
CPC ........... *D03D 1/0094* (2013.01); *D03D 13/00* (2013.01); *F16G 1/10* (2013.01); *B29C 65/48* (2013.01); *D10B 2401/061* (2013.01)

(58) Field of Classification Search
CPC .................................. B29C 65/48; F16G 1/10
See application file for complete search history.

(56) References Cited

U.S. PATENT DOCUMENTS

| | | | | |
|---|---|---|---|---|
| 4,282,011 | A * | 8/1981 | Terpay ................... | B24D 11/02 51/293 |
| 5,529,545 | A | 6/1996 | Isshiki et al. | |
| 2003/0078125 | A1* | 4/2003 | Knutson ................... | F16G 1/10 474/263 |
| 2008/0257471 | A1* | 10/2008 | Cottin ................... | B60C 13/001 152/524 |
| 2009/0014084 | A1* | 1/2009 | Hawkins ............. | D06M 15/693 156/137 |

FOREIGN PATENT DOCUMENTS

WO    2011003090 A1    1/2011

OTHER PUBLICATIONS

International Search Report, issued in PCT/IB2021/052169, mailed Jul. 7, 2021, Rijswijk, NL.

\* cited by examiner

*Primary Examiner* — Philip C Tucker
*Assistant Examiner* — Nickolas R Harm
(74) *Attorney, Agent, or Firm* — ArentFox Schiff LLP; Michael Fainberg

(57) ABSTRACT

A process for manufacturing a bonded fabric for high performance industrial belts is provided. The process includes providing a base fabric made up of warp yarns provided with a predetermined elasticity and weft yarns provided with a lower elasticity than the warp yarns, and subjecting the base fabric to a bonding treatment.

5 Claims, 5 Drawing Sheets

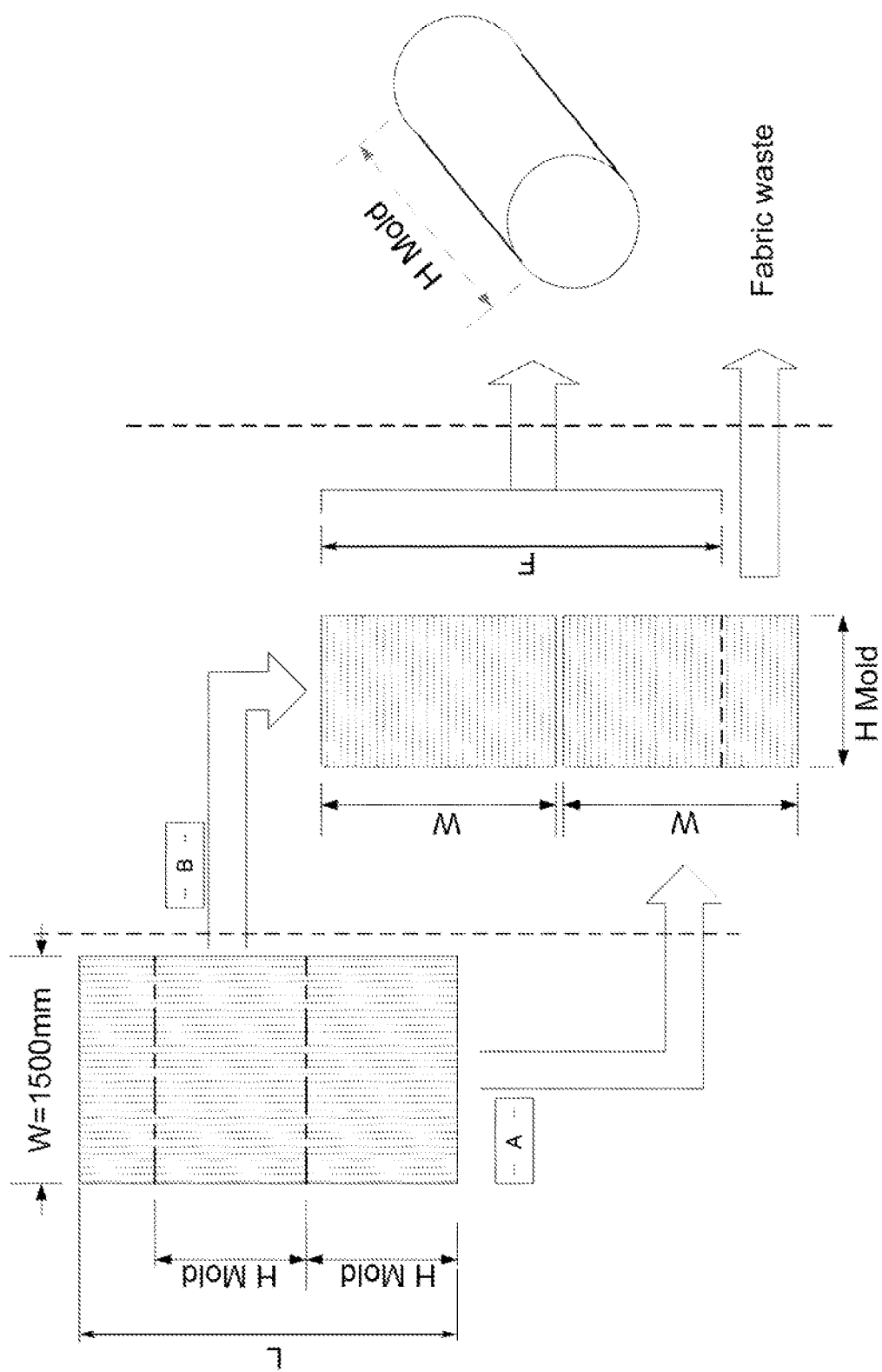
FIG.9 - Prior art

BASE FABRIC, BONDED FABRIC, HIGH PERFORMANCE BELT AND MANUFACTURING PROCESSES THEREOF

CROSS-REFERENCE TO RELATED APPLICATIONS

This application is a National Phase Application of PCT International Application No. PCT/IB2021/052169, having an International Filing Date of Mar. 16, 2021 which claims priority to Italian Application No. 102020000005740 filed Mar. 18, 2020, each of which is hereby incorporated by reference in its entirety.

TECHNICAL FIELD

The present invention relates to the field of high-performance, high-reliability belts, used in innumerable technical sectors, e.g. as in the automotive sector, in the machine tool construction sector, in the transport sector, e.g. such as power transmission belts, tangential flat belts, and the like. In particular, the present invention relates to the field of belts made up of a matrix, a core embedded in the matrix, and a bonded fabric covering at least some regions of the belt, such as the teeth or the back.

The present invention relates to an innovative bonded fabric, a belt comprising the bonded fabric, a process for manufacturing the bonded fabric, and the belt.

BACKGROUND ART

Currently (FIG. 9), drive belts are made by cutting a cylindrically shaped semifinished product orthogonally to the axis, the circumference of the semifinished product corresponding to the desired length of the belt. The semifinished product is obtained by co-molding an elastomeric compound, a bonded fabric placed in the mold at given regions critical for belt functionality, e.g. the outer surface of the teeth, and a core, which will be embedded in the matrix. The molded semifinished product is then subjected to vulcanization and finally cut as mentioned above.

The bonded fabric is made up of a raw fabric embedded in a matrix of polymeric materials, such as resorcinol, formaldehyde, and latex (in the latter case, we speak of raw fabric subjected to RFL treatment), suitable for binding to the compound of the cylindrical semifinished product.

The raw fabric is derived from a base fabric, typically obtained in a flat loom, in which the warp, in the length direction L of the base fabric, is substantially rigid, while the weft, in the width direction W of the base fabric, is elastic.

While the length L of the base fabric has no particular constraints, the maximum width is limited by the width of the loom used and the subsequent finishing lines (tumbler).

As a rule, a loom is used to produce a fabric having a width equal to about twice that desired by the customer. The produced fabric is then elastically shrunk, typically in tumblers.

At the end of this process, the fabric is band-shaped with wavy side edges, according to the elastic return of the material, and, therefore, it is necessary to provide a further step of trimming (longitudinal cutting of the edges) to obtain the desired width W, causing waste and a residual tension state, which cannot be controlled, in the direction of the weft.

Such factors accentuate the natural variability of the industrial processes, ultimately resulting in a marked variability of the reliability and the performance of the end product (the belt).

A piece of base fabric ready for the bonding treatment has a predetermined length L (warp) and a predetermined width W (weft) and in this format, it is subjected to the heat treatment process, in which the geometric dimensions vary as a function of the quality of the previous finish and the textile fibers used (the dimension W may increase or decrease without the possibility of control, generating further variability in the final use).

Therefore, for assembly and functional reasons of the belt, the bonded fabric must be elastic along the length of the belt, the end-user must divide the bonded fabric into n portions having width W (weft, elastic) and length H (warp, rigid) imposed by the size of the mold. The portions are rotated by 90°, placed side-by-side, and joined in the direction of the warp, obtaining a band F of width H, rigid because it corresponds to the warp, and length n×W, elastic because it corresponds to the weft. The band F is cut into the length n×W, to obtain the length of the belt, thus procuring waste.

OBJECT OF THE INVENTION

It is the object of the present invention to manufacture a belt, as well as a process for obtaining the belt, which allow to overcome the drawbacks mentioned above, with particular reference to containing waste, economically optimizing the production process, and obtaining belts having reliability and less random performances.

Such a purpose is achieved by the processes, the base fabric, and the bonded fabric as described and claimed herein. Advantageous embodiments of the present invention are also described.

BRIEF DESCRIPTION OF THE DRAWINGS

The features and advantages of the process and of the bonded fabric according to the present invention will become apparent from the following description, given by way of non-limiting example, according to the accompanying figures, in which:

FIG. 9 is a diagram of a manufacturing process of a belt according to the prior art, which is not the object of the present invention.

DETAILED DESCRIPTION

According to the present invention, a base fabric 1 is manufactured, which is made up of the warp yarns 2 in the longitudinal direction and weft yarns 4 in the transverse direction, orthogonal to the transverse direction. For example, the base fabric 1 is produced using a flat loom, to obtain a piece of base fabric having a weft width W, preferably equal to the width H available for a mold of a belt, as discussed below, and a warp length L.

In particular, the warp yarns 2 have a modulable elasticity as a function of the specific needs of the product, e.g. for medium tenacity yarns, with a fabric weight between 280-320 g/m2:

an elongation of 50% can be obtained with a force between 10-40N, preferably 25N;

an elongation of 60% can be obtained with a force between 20-60N, preferably 40N;

an elongation of 70% can be obtained with a force between 30-85N, preferably 55N.

The weft yarns 4 are substantially rigid relative to the warp yarns, with moduli of elasticity dependent on the chosen fiber. For example, in the case of polyamide yarn (Nylon 6,6), the elongation value at 100N is between 3-7%, preferably about 5%.

For example, when a force of 100N is applied, a warp yarn exhibits a percentage elongation at least equal to 10 times the elongation of a weft yarn at 100N.

Figure 1:
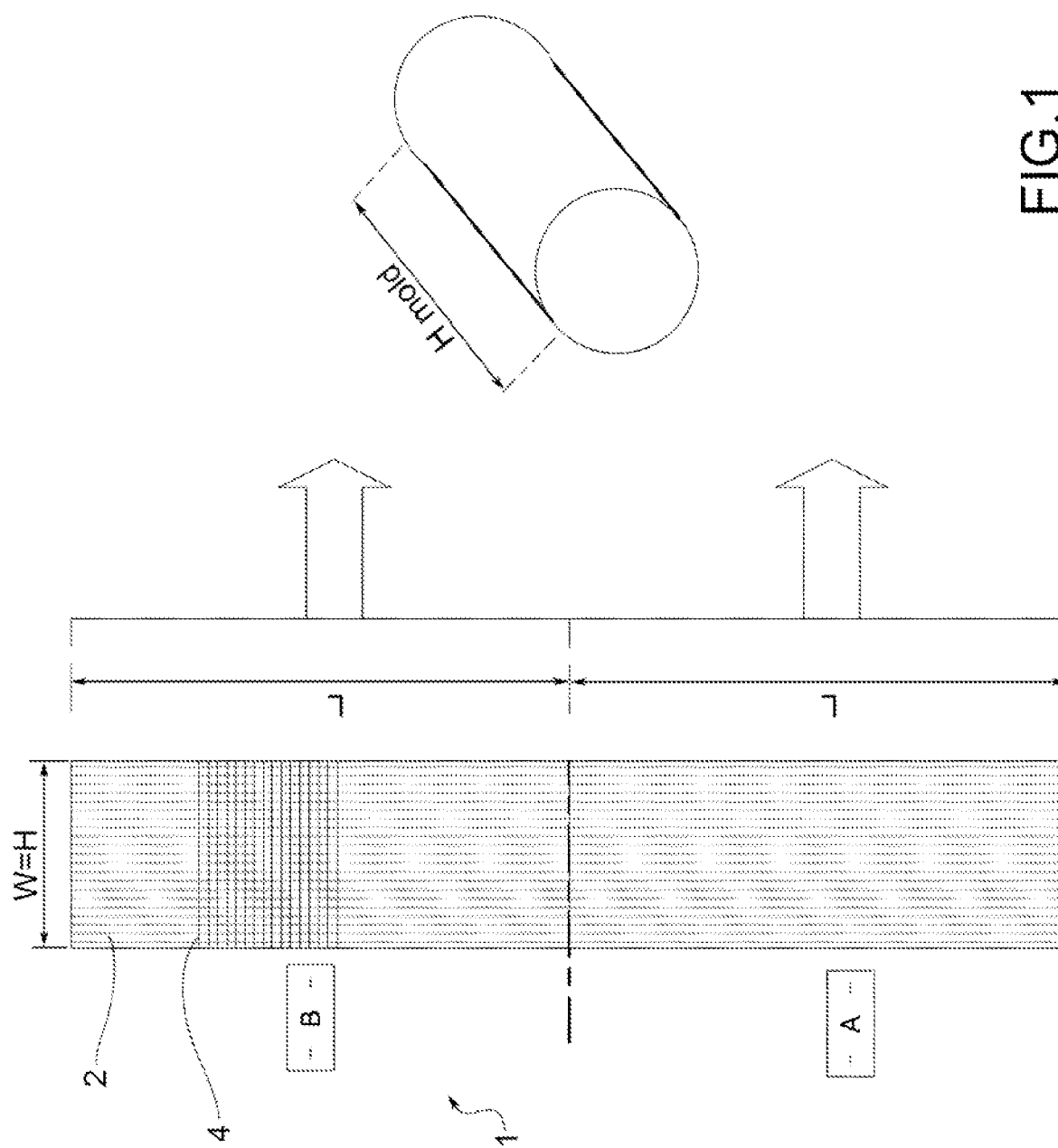
FIG. 1 shows a diagram of a manufacturing process of a belt, according to an embodiment of the present invention.
Figure 2:
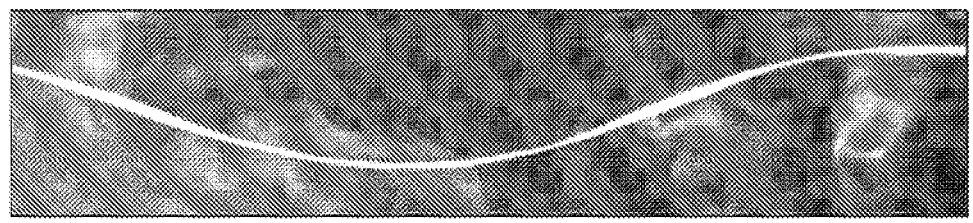
FIG. 2 is a photographic image of a warp yarn made up of parallel filaments.

According to an embodiment, each warp yarn 2 is made up of one or more parallel or twisted yarns (FIG. 2), e.g. made of high or medium tenacity polyamide.

According to a further embodiment, each warp yarn 2 is made up of one or more textured yarns, e.g. high or medium tenacity polyamide.

Figure 3:
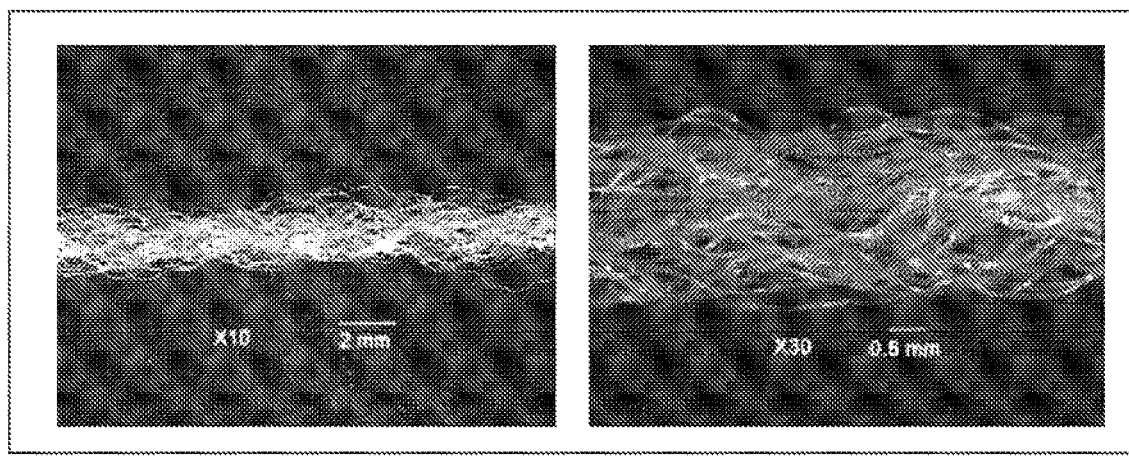
FIG. 3 contains two photographic images of a textured yarn, at different magnifications.

A textured yarn, e.g. a polyamide yarn (nylon 6,6), is obtained by means of a texturing process, which exploits the physical and thermoplastic properties of synthetic yarns; the thermal action, combined with a mechanical one, allows to obtain a bulky yarn, with a covering and elastic power (FIG. 3).

Figure 4:
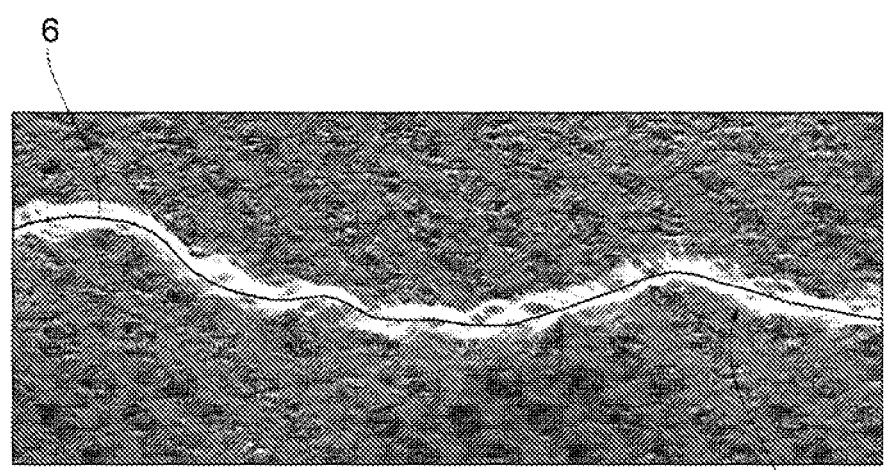
FIG. 4 is a photographic image of a warp yarn comprising a yarn core and an additional yarn.

According to a yet further embodiment (FIG. 4), each warp yarn 2 is made up of a yarn core 6, which, in turn, is made up of one or more yarns, either parallel or twisted, e.g. made in polyamide (e.g., medium and/or high tenacity nylon, nylon 6,6) or elastomer (polyurethane, natural rubber, synthetic rubber), and an additional yarn 8 which accompanies the yarn core 6 along its extension, either encompassing or wrapping it; preferably, the additional yarn 8 is made up of one or more textured yarns, e.g. made of polyamide (medium and/or high tenacity nylon, nylon 6,6).

The weft yarns are preferably made up of one or more yarns, either parallel or twisted, made of polyamide (nylon, nylon 6,6) or polyester, glass fibers (variants E, K, U), meta- and para-aramid, carbon fibers, polyvinyl alcohol, polyester, viscose rayon, or combinations thereof.

Figure 5A:
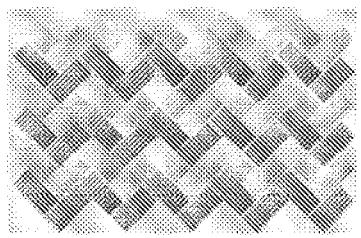
FIGS. 5a and 5b diagrammatically show a herringbone base fabric.
Figure 5B:
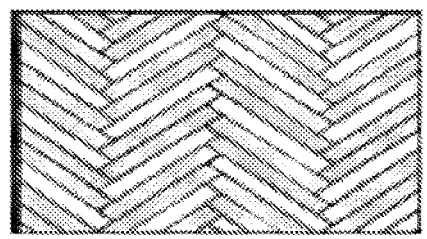

Preferably, the weaving to obtain the base fabric is performed to obtain a herringbone fabric (FIGS. 5a and 5b), i.e., a diagonal fabric with twill weave, the pattern of which resembles the arrangement of the beards in the ear of wheat. Advantageously, herringbone weave showed a remarkable tendency to maintain orthogonality between the warp and the weft yarns, thus conferring rigidity, stability, and strength.

Preferably, the warp yarns 2 are pretensioned during the weaving of the base fabric 1; consequently, when the base fabric 1 is obtained, an elastic shrinkage process is performed, during which the longitudinal elongation of the fabric, due to the pretensioning, is recovered.

Figure 6:
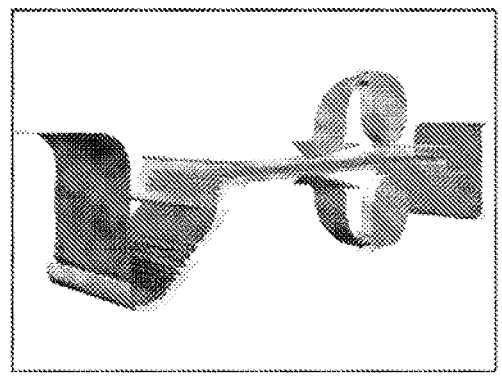
FIG. 6 diagrammatically shows a step of elastic shrinkage and thermal-mechanical treatment of the base fabric.

For example, said elastic shrinkage process consists of one or more heat-mechanical treatment steps (FIG. 6).

According to an embodiment, after the heat-mechanical treatment process, the base fabric 1 is folded into sheets, so as not to reconstitute undesirable residual internal tensions, and finally, preferably, wound into a roll, taking care not to cause any stretching.

The base fabric 1 is subsequently used to make a bonded fabric 10.

Figure 7A:
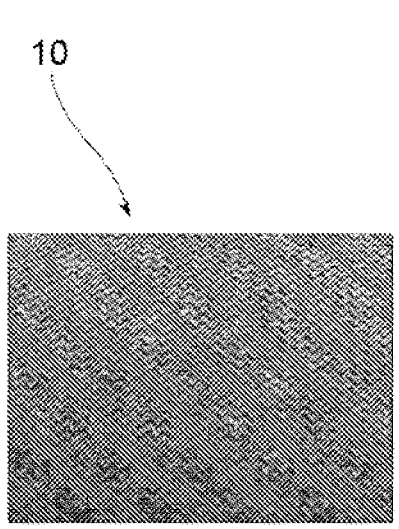
FIGS. 7a and 7b are photographic images of bonded fabrics according to the present invention.
Figure 7B:
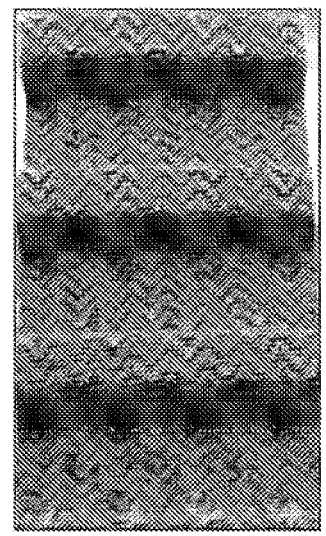

For this purpose, the base fabric 1, e.g. wound in a roll, is subjected to a bonding treatment, to obtain the bonded fabric 10, in which the warp yarns 2 and weft yarns 4 are coated with a covering consisting of solidified polymeric materials (FIGS. 7a and 7b). In other words, the warp and weft yarns are embedded in a flexible matrix.

For this purpose, the base fabric 1 is worked continuously, in a plant commonly known as a "bonding line", comprising a base fabric feeding area, an imbibition area in an adhesive and management of the residual adhesive on the fabric, drying and resinification furnaces and a finished product collection area. Such a line is provided with voltage control systems for the various stages of the process.

For example, the base fabric is impregnated in an adhesive made up of an aqueous solution based on resorcinol, formaldehyde, and latex (vinylpyridine or HNBR). The weight (g/m2) of the bonded fabric is preferably between 10 and 35% greater than the base fabric, typically between 20 and 32% greater than the base fabric.

Preferably, during the bonding treatment, the longitudinal tension of the fabric at the inlet of the furnaces is controlled, to calibrate the longitudinal elasticity of the bonded fabric, usually indicated by the longitudinal elongation obtainable as a function of the applied longitudinal stress.

For example, a fabric tension at the inlet of the furnaces, such that it results in a stretching of 5%, produces a bonded fabric capable of stretching by 50% when a force of 20N is applied; according to a further example, a fabric tension at the inlet of the furnaces, such that it results in a stretching of 15%, produces a bonded fabric capable of stretching by 50% when a force of 36N is applied.

Furthermore, according to a preferred embodiment, the adhesive has a formulation adapted to obtain an antistatic behavior of the fabric, e.g. with conductivity values between 10-150 KOhm (measurement made according to ISO 9563).

Preferably, the bonded fabric thus obtained as a specific weight comprised between 100 and 1200 g/m2.

Furthermore, the bonded fabric thus obtained preferably has an elongation between 20-100%, with an applied load of 100N on a standard 2.5 cm long specimen (ISO 13934-1).

The bonded fabric 10 is then preferably wound into a roll and available for producing a circumferentially closed belt 100; the longitudinal direction of the bonded fabric coincides with the circumferential direction of the belt.

Figure 8A:
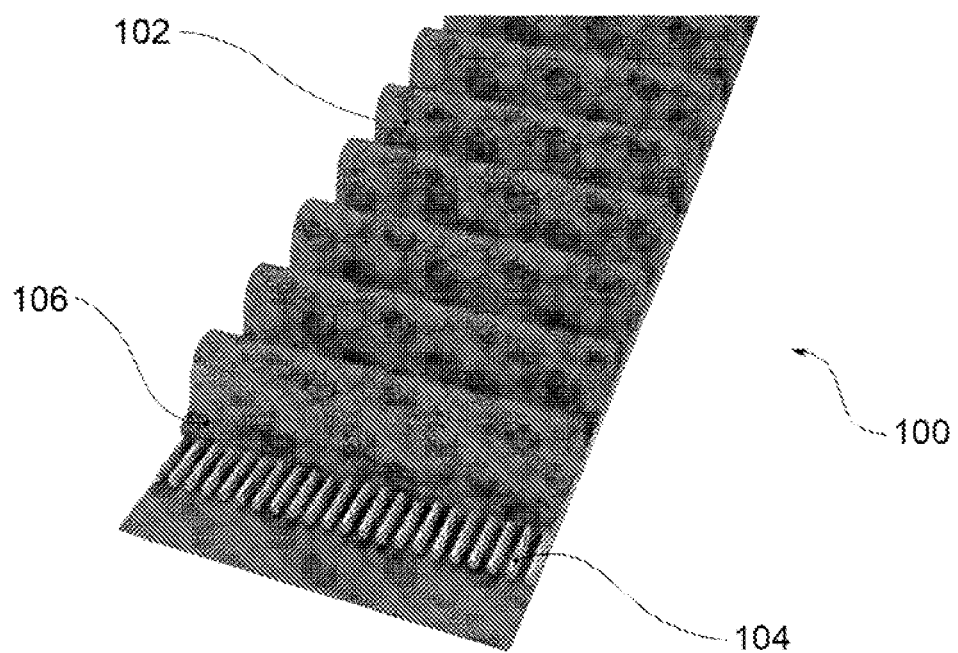
FIGS. 8a and 8b show belts manufactured according to the present invention.
Figure 8B:
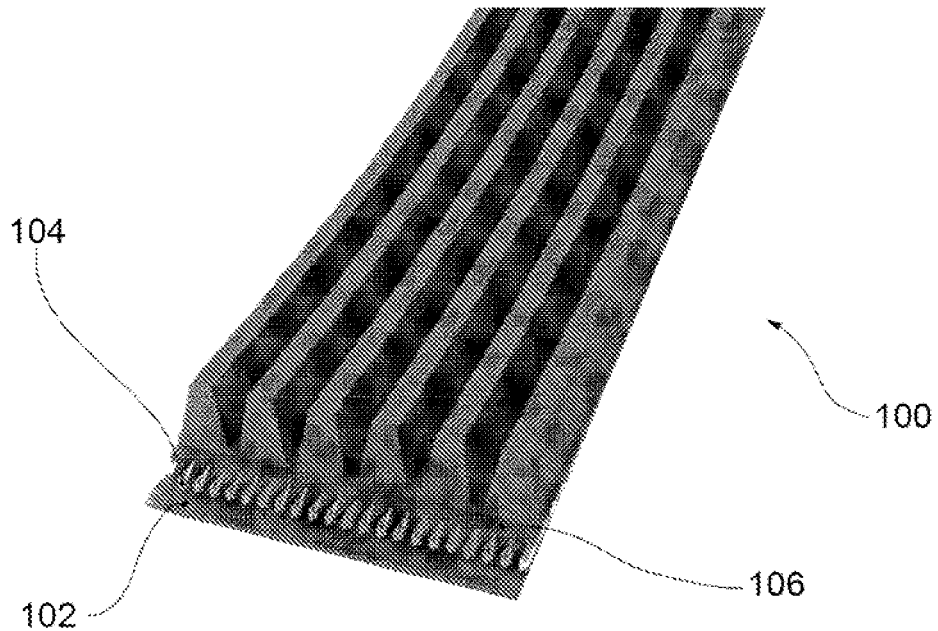

The belt 100 according to the invention has a surface region 102 made from a portion of the bonded tissue 10, a belt core 104, and a matrix 106, in which the belt core 104 is embedded and which adheres intimately to the surface region 102 (FIGS. 8a and 8b).

For example, according to an embodiment, the surface region is made up of the outer surface of the teeth of a belt, appropriately shaped, e.g. in a synchronous belt or timing belt (FIG. 8a). According to a further embodiment, the surface region is made up of the back of the belt, e.g. in a flat belt or of the Poly-V type (FIG. 8b). According to a yet further embodiment, the surface region is made up of the sides of the belt, e.g. in a trapezoidal belt.

Furthermore, the belt core 104 is preferably made up of glass or aramid fibers to limit the longitudinal elongation of the belt.

Furthermore, the matrix 106 is preferably made up of a compound comprising rubber, of synthetic or natural origin, or polyurethane.

According to the invention, the bonded fabric 10 is cut into a woven portion having a longitudinal length L substantially equal to the length of the belt 100 which is desired to be obtained, taking an overlap into account, of which more will be said below; the width W is typically already corresponding to the width H of a mold or multiples thereof (in this case, the fabric will also be appropriately cut longitudinally during use).

The woven portion is folded to form a cylindrical element, and the longitudinal ends are sewn or otherwise joined, e.g. by heat-sealing; it is to achieve such a joint that the overlap must be taken into account.

Advantageously, the cylindrical element thus obtained has only one seam line, wherein the ends of the woven portion are joined.

The cylindrical bonded fabric element is used in a mold, together with the belt core, to obtain the belt 100 in an overmolding process, in which the compound for the die is injected into the mold.

The overmolding process produces an initial cylindrical semifinished product, which undergoes vulcanization to obtain a final cylindrical semifinished product.

The final cylindrical semifinished product is finally cut orthogonally to the axis to obtain a plurality of belts 100.

Innovatively, the process according to the present invention allows to reduce waste, because the width of the base fabric can be chosen according to needs, in particular, according to the size of the mold or multiples thereof, and the length can be chosen according to the length of the belt.

Furthermore, advantageously, the reliability and performance of the belt are highly repeatable because the influence of random process variables, such as the distribution of residual stresses in the base fabric, is reduced.

According to a further advantageous aspect, the invention allows to make bonded fabrics having specific longitudinal elongation characteristics, according to needs; this allows to divide high elongation products, e.g. with elongation >70% above 100N, from low elongation products, e.g. with elongation >25% above 100N (tests carried out according to ISO 13934-1).

According to a further advantageous aspect, the warp and weft yarns maintain high orthogonality.

Once the fabric is cut, any deviation in orthogonality between warp and weft, as is the case with solutions of the prior art, would lead to non-uniform ultimate tensile loads and potentially a significant reduction in nominal breaking loads. Advantageously, according to the invention, the warp yarns and the weft yarns maintain high orthogonality, keeping close to the value of 90°.

It is apparent that a person skilled in the art may make changes to the process and the bonded fabric according to the present invention, all of which are contained within the scope of protection as defined in the following claims to satisfy contingent needs.

The invention claimed is:

1. A process for manufacturing a bonded fabric for a belt, the process comprising:
   providing a base fabric made up of warp yarns in a longitudinal direction and weft yarns in a transverse direction, orthogonal to the longitudinal direction, wherein the warp yarns are provided with a predefined elasticity and the weft yarns are provided with a lower elasticity than the warp yarns;
   subjecting the base fabric to a bonding treatment, wherein the warp yarns and the weft yarns are coated with a covering made of solidified polymeric materials, wherein the bonding treatment comprises an imbibition step, a drying step in a furnace, and a resinification step,
   wherein, during the imbibition step, the base fabric is impregnated with an aqueous solution based on resorcinol, formaldehyde, and latex; and
   wherein, after the resinification step, the bonded fabric has a weight (g/m$^2$) between 20% and 32% greater than the weight of the base fabric.

2. The process of claim 1, wherein longitudinal tension of the base fabric is controlled at entrance to the furnace.

3. The process of claim 1, wherein the bonded fabric has a specific weight comprised between 100 and 1200 g/m2.

4. The process of claim 1, wherein the bonded fabric has an elongation between 20% and 100%, when a load of 100N is applied.

5. The process of claim 1, wherein, when a load of 100N is applied, a warp yarn has an elongation percentage of at least 10 times the elongation when a load of 100N is applied to a weft yarn.

\* \* \* \* \*